June 1, 1926.
K. G. ANDERSON
1,586,640
METALLIC SPOOL AND METHOD OF MAKING THE SAME
Filed March 9, 1925
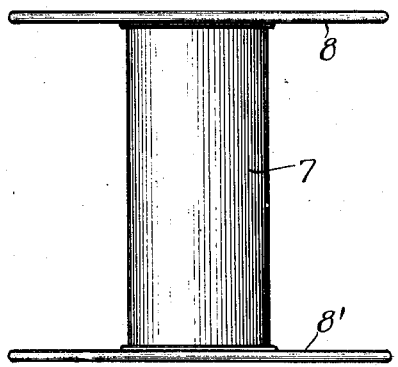
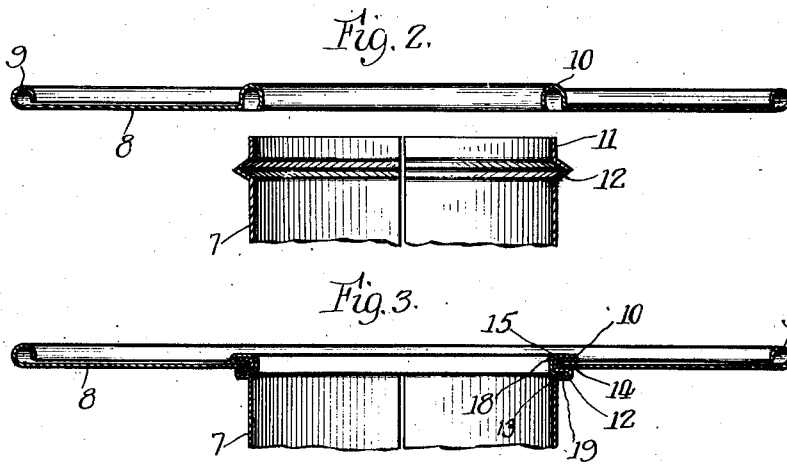
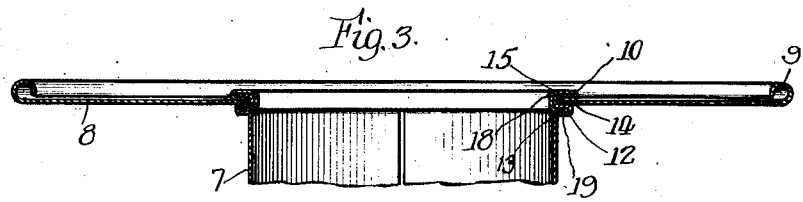
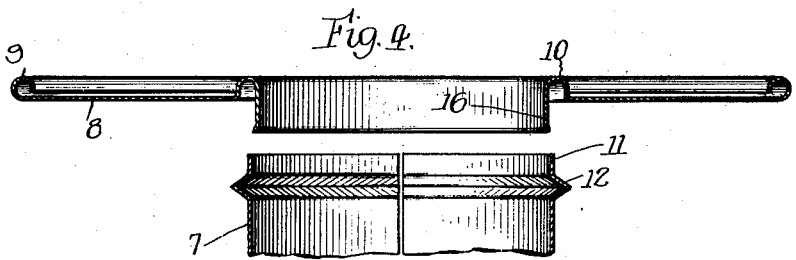
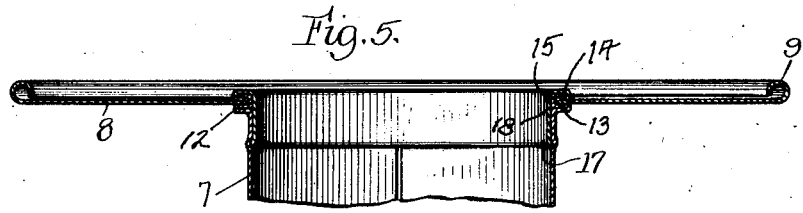
Inventor:
Knute G. Anderson,
By Shindell, Parker & Carlson
Attys.

Patented June 1, 1926.

1,586,640

UNITED STATES PATENT OFFICE.

KNUTE G. ANDERSON, OF ROCKFORD, ILLINOIS, ASSIGNOR TO J. L. CLARK MANUFACTURING CO., OF ROCKFORD, ILLINOIS, A CORPORATION OF ILLINOIS.

METALLIC SPOOL AND METHOD OF MAKING THE SAME.

Application filed March 9, 1925. Serial No. 13,969.

The invention pertains to spools of the type formed of sheet metal and comprising generally a main body or cylinder and a pair of end pieces or heads secured upon opposite ends of the cylinder.

The object of the invention is to provide an improved method of construction whereby the end pieces or heads may be more effectually secured to opposite ends of the body or cylinder than heretofore, to the end that a spool of an advantageous character may be produced.

In the accompanying drawings Figure 1 is an elevational view of a spool constructed in accordance with my invention.

Fig. 2 is a fragmentary longitudinal sectional view through one end of the body or cylinder and through an end piece or head prior to the assembling operation.

Fig. 3 is a similar view but showing the parts secured together.

Figs. 4 and 5 are views respectively similar to Figs. 2 and 3 but showing a slightly modified form of the invention.

The body of the spool indicated by the numeral 7 is in the form of a cylinder or tube formed in the present instance by being rolled up from a flat sheet of metal of suitable gage. 8 and 8' designate the heads of the spool, which are secured upon opposite ends of the tubular body 7 in accordance with my invention.

The heads 8 and 8' are alike formed from a disk of sheet metal having its outer peripheral edge curled inwardly to form a peripheral strengthening bead 9. The disk has a central aperture therein defined by an annular bead 10 of a diameter corresponding to the diameter of the body 7 and opening in the direction of the body so as to receive an end portion 11 thereof.

Each end of the tubular body 7 has formed thereon an outwardly projecting bead 12 terminating in the end portion 11, which latter is made of a length substantially equal to the depth of the bead 10 in the head.

The parts having been separately formed as shown in Fig. 2, they are brought into assembled relation with the end portion 11 of the tubular body entered into the bead 10 of the head, and by means of suitable forming devices the bead 10 and the end portion 11, are caused to interlock, the bead 12 on the body being flattened to form a seat or shoulder 13. This operation upon the bead 10 and the end portion 11 therein consists in forming a fold in the outer wall of the bead 10 and the adjacent portion of the head, thus providing an inwardly projecting bead 14 as shown in Fig. 3. This inwardly projecting bead engages with the shoulder 13 formed by the bead 12, and the end portion 11 is bent so as to form with this shoulder portion 13 of the bead 12 an interlocking channel or groove 15 receiving the bead 14.

It will be seen that the construction provides at the end of the tubular body an outwardly opening groove 15 and an inwardly directed bead 14 on the head engaging in said groove, with a curl 18 bent around the end of the body. This construction insures that the head shall be firmly secured onto the end of the body. As shown in Figs. 4 and 5 the curl 18 may be extended into the end of the tubular body a short distance, terminating, for example, at 17; but in the construction shown in Figs. 2 and 3, the parts are additionally secured together by interlocking the curl 18 in an inwardly opening groove 19 formed by the bead 12 of the body.

I claim as my invention:—

1. A metallic spool comprising a tubular body having an annular bead near but spaced a short distance from one end, and a head secured upon said end of the tubular body, said end portion of the body being bent to form with said bead an outwardly opening groove, and the head providing an inwardly projecting bead interengaging with said groove in the body and a curl passing around the end of the body.

2. A metallic spool having a tubular body shaped to form inwardly and outwardly opening annular grooves, and a head shaped to form an inwardly projecting bead engaging in the outwardly opening groove of the body and a curl integral with said bead bent around the end of the body and into the inwardly opening groove therein.

3. A metallic spool comprising a tubular body and a pair of heads on opposite ends of the body, each end of the body being shaped to form inwardly and outwardly opening annular grooves and each head being shaped to form an inwardly projecting bead engaging in the outwardly opening groove of the body, and a curl integral with said bead bent around the end of the body.

4. The method of making metallic spools which consists in making a tubular body portion with an annular bead and a projecting end portion, forming a head from a flat sheet of metal with an annular bead therein providing a groove adapted to receive the end portion of the body, and shaping said end portion and bead together to form an outwardly opening groove in the body and an inwardly projecting bead on the head folded within the outwardly opening groove.

In testimony whereof, I have hereunto affixed my signature.

KNUTE G. ANDERSON.